United States Patent
Hayashi et al.

(10) Patent No.: US 6,992,957 B2
(45) Date of Patent: Jan. 31, 2006

(54) CONTROLLER OF DATA RECORDER

(75) Inventors: Koji Hayashi, Hashima (JP); Akira Tsukihashi, Gunma-ken (JP); Yasushi Hanamoto, Hanyu (JP); Tohru Tanaka, Ota (JP)

(73) Assignee: Sanyo Electric Co., Ltd.

( * ) Notice: Subject to any disclaimer, the term of this patent is extended or adjusted under 35 U.S.C. 154(b) by 311 days.

(21) Appl. No.: 09/748,506

(22) Filed: Dec. 26, 2000

(65) Prior Publication Data
US 2001/0006495 A1 Jul. 5, 2001

(30) Foreign Application Priority Data

Dec. 27, 1999 (JP) .......................................... 11-369787
Oct. 18, 2000 (JP) ....................................... 2000-317878

(51) Int. Cl.
G11B 20/10 (2006.01)
G11B 7/00 (2006.01)

(52) U.S. Cl. ................................. 369/47.3; 369/47.321; 369/30.23; 369/47.31; 369/53.31

(58) Field of Classification Search ............ 369/47.321, 369/47.33, 47.34, 53.24, 53.34, 53.36, 53.37, 369/53.31, 124.06, 53.26, 47.31, 47.3, 30.23, 369/47.55, 44.36, 47.13, 53.32, 44.11, 53.18; 710/59, 57; 711/111; 360/48, 51
See application file for complete search history.

(56) References Cited

U.S. PATENT DOCUMENTS

| 4,507,767 A | 3/1985 | Takasugi | 369/53.26 |
| 4,546,462 A | 10/1985 | Koishi et al. | 369/53.21 |

(Continued)

FOREIGN PATENT DOCUMENTS

| EP | 0 507 571 | 10/1992 |
| EP | 0 974 966 | 1/2000 |

(Continued)

OTHER PUBLICATIONS

Japan registered publication No. 2842262, equivalent to above noted document AG.

Abstract for Japanese Patent No. JP1312736, Publication Date Dec. 18, 1989, Title: Optical Disk Device and Optical Disk.

(Continued)

Primary Examiner—William Korzuch
Assistant Examiner—Kim-Kwok Chu
(74) Attorney, Agent, or Firm—Fish & Richardson P.C.

(57) ABSTRACT

A controller of a data recorder that records data on a recording medium such that the occurrence of buffer underrun errors are prevented. Data encoded by an encoder is recorded on the recording medium. A decoder decodes the data recorded on the recording medium. The data recorder interrupts the recording of data when a buffer underrun is likely to occur. The controller restarts the recording of data when the decoded data and the encoded data are synchronized. When the decoded data is delayed from the encoded data, the controller stops the encoding until the decoded data catches up with the encoded data.

12 Claims, 3 Drawing Sheets

U.S. PATENT DOCUMENTS

| | | | |
|---|---|---|---|
| 4,800,548 A | 1/1989 | Koishi et al. | 369/53.18 |
| 4,831,611 A | 5/1989 | Sasaki et al. | 369/53.31 |
| 4,858,219 A | 8/1989 | Yoshikawa | 369/44.11 |
| 4,860,272 A | 8/1989 | Nishikawa et al. | 369/53.28 |
| 5,010,534 A | 4/1991 | Enari et al. | 369/30.16 |
| 5,161,144 A | 11/1992 | Takeuchi et al. | 369/53.32 |
| 5,170,389 A | 12/1992 | Numata et al. | 369/116 |
| 5,212,678 A | 5/1993 | Roth et al. | 369/47.33 |
| 5,220,545 A | 6/1993 | Tomimitsu | 369/30.23 |
| 5,289,440 A | 2/1994 | Bakx | 369/30.23 |
| 5,305,298 A | 4/1994 | Yokota | 369/53.26 |
| 5,317,553 A | 5/1994 | Ohga et al. | 369/53.18 |
| 5,436,875 A | 7/1995 | Shinada | 369/30.23 |
| 5,463,607 A | 10/1995 | Roth et al. | 369/47.33 |
| 5,477,516 A | 12/1995 | Takezawa | 369/30.04 |
| 5,491,677 A | 2/1996 | Sasaki | 369/44.36 |
| 5,521,893 A | 5/1996 | Yamasaki et al. | 369/47.55 |
| 5,532,991 A | 7/1996 | Sasaki | 369/44.35 |
| 5,586,093 A | 12/1996 | Honda et al. | 369/47.13 |
| 5,680,379 A | 10/1997 | Ishida et al. | 369/47.33 |
| 5,682,366 A | 10/1997 | Yamanaka et al. | 369/53.28 |
| 5,745,445 A | 4/1998 | Yasukohchi et al. | 369/30.23 |
| 5,815,472 A | 9/1998 | Kuroda et al. | 369/47.33 |
| 5,818,801 A | 10/1998 | Watanabe et al. | 369/30.23 |
| 5,831,955 A * | 11/1998 | Arataki et al. | 369/47.32 |
| 5,910,935 A | 6/1999 | Takagi et al. | 369/47.34 |
| 5,953,291 A | 9/1999 | Yasukohchi et al. | 710/57 |
| 6,055,216 A | 4/2000 | Shintani | 369/47.31 |
| 6,084,731 A * | 7/2000 | Uchida et al. | 360/48 |
| 6,115,337 A | 9/2000 | Takagi et al. | 369/47.34 |
| 6,198,707 B1 | 3/2001 | Yamamoto | 369/47.25 |
| 6,208,599 B1 | 3/2001 | Fukuda | 369/53.36 |
| 6,219,309 B1 | 4/2001 | Kuroda et al. | 369/30.23 |
| 6,269,059 B1 | 7/2001 | Kuroda et al. | 369/47.28 |
| 6,272,084 B1 | 8/2001 | Maeda | 369/47.34 |
| 6,438,083 B1 | 8/2002 | Kroon | 369/47.3 |
| 6,487,616 B1 | 11/2002 | Hayashi | 710/59 |
| 6,522,608 B1 | 2/2003 | Kuroda | 369/47.28 |
| 6,538,962 B2 | 3/2003 | Hyun | 369/30.23 |
| 6,570,832 B2 | 5/2003 | Yamamoto | 369/59.25 |
| 6,584,053 B1 | 6/2003 | Tsukihashi | |
| 6,587,416 B1 | 7/2003 | Tsukihashi | 369/59.14 |
| 6,594,213 B1 | 7/2003 | Hayashi | 369/47.34 |
| 6,693,857 B1 | 2/2004 | Willis | 369/30.23 |
| 6,704,387 B1 | 3/2004 | Lin | 377/33 |
| 6,775,211 B1 | 8/2004 | Tsukihashi | 369/47.28 |

FOREIGN PATENT DOCUMENTS

| | | |
|---|---|---|
| JP | 63-52393 | 3/1988 |
| JP | 1-312736 | 12/1989 |
| JP | 02223066 | 9/1990 |
| JP | 03228266 | 10/1991 |
| JP | 4-103079 | 4/1992 |
| JP | 5-282696 | 10/1993 |
| JP | 10-049990 | 2/1998 |
| JP | 10-063433 | 3/1998 |
| JP | H11-66745 | 3/1999 |
| JP | 11-259982 | 9/1999 |
| JP | 2000-040302 | 2/2000 |
| KR | 1998-028125 | 7/1998 |
| KR | 1999-024893 | 4/1999 |

OTHER PUBLICATIONS

Abstract for Japanese Patent No. JP3260958, Publication Date: Nov. 20, 1991, Title: Optical Disk Device.

Abstract for Japanese Patent No. JP6076401, Publication Date: Mar. 18, 1994, Title: Magneto–Optical Recording Method for Magneto–Optical Disk of Large Heat Time Constant, Recording Device and Magneto–Optical Disk.

Abstract for Japanese Patent No. JP6162511, Publication Date: Jun. 10, 1994, Title: Recording Method for Optical Disk Employing Draw Type Disk Recording Device.

Abstract for Japanese Patent No. JP10241165, Publication Date: Sep. 11, 1998, Title: Pulse Generating Circuit and Optical Disc Driver.

* cited by examiner

CONTROLLER OF DATA RECORDER

BACKGROUND OF THE INVENTION

The present invention relates to a controller of a data recorder, and more particularly, to a data recorder controller for controlling the recording of data in a data recorder, which writes data to a medium.

An optical disc recorder records data on an optical disc, which serves as a recording medium. A CD-DA family compact disc-recordable (CD-R) drive is one type of optical disc recorder that is widely used. A CD-R is a so-called write-once optical disc on which data is written only once. The recorded data cannot be physically deleted. A laser beam is irradiated against the optical disc from an optical head of the CD-R drive. The heat of the laser beam melts a dye and forms recording pits on a recording layer of the optical disc. Data is recorded on the disc by changing the reflecting rate of the recording layer.

The optical disc recorder includes a buffer memory and an encoder. The buffer memory temporarily stores data provided from an external device, such as a personal computer. The encoder reads the data from the buffer memory and encodes the read data to record the data on the optical disc.

In such an optical disc recorder, if, for example, the rate of data transmission from the external device is slower than the recording data transmission rate of the optical disc (write speed), the transmission rate of the recording data output from the encoder is faster than the transmission rate of the data provided to the buffer. This decreases the amount of data stored in the buffer memory. If the decrease continues, the data amount ultimately becomes null and the buffer memory becomes empty. This stops the stream of data to the encoder and causes an interruption in the data recorded on the optical disc. This problem is referred to as buffer underrun. The interruption in the data recorded on the optical disc resulting from buffer underrun is referred to as a buffer underrun error.

Data is recorded on an optical disc using a recording technique that designates the file group recorded on the optical disc (e.g., disc at once, track at once) Thus, if a buffer underrun error occurs, the entire optical disc becomes unusable when employing disc at once, and the track undergoing recording becomes unusable when employing track at once.

Recent CD-R drives record data at a speed four times or eight times the normal recording speed. Further, recent personal computers have multitasking functions to operate CD-R drives. This has increased the tendency of the occurrence of buffer underrun errors.

Packet writing is one type of data recording that records data in packet units. Packet writing records data on an optical disc when the data reaches the capacity of the packet. This prevents the occurrence of buffer underrun errors. However, link blocks must be formed to connect packets in packet writing. The link blocks decrease the recording capacity of the optical disc. Further, there are CD-ROM drives that are not capable of handling packet writing. Such CD-ROM drives cannot reproduce data written to optical discs through packet writing. In other words, the CD-ROM compatibility required by the CD-R standard (Orange Book Part II) does not include packet writing. For example, packet writing cannot be applied for a CD-DA player. Thus, a CD-R drive cannot record CD-DA audio data through packet writing. Accordingly, there is a need for preventing buffer underrun errors without employing packet writing.

A CD-recordable write (CD-RW) drive is another type of optical disc recorder that is widely used. A CD-RW drive irradiates a laser beam from an optical head against an optical disc. The heat of the laser beam causes phase changes between amorphic and crystalline to form recording pits on the recording layer of the optical disc. This changes the reflecting rate of the recording layer and records data on the optical disc. Data can be repeatedly rewritten to optical discs used by the CD-RW drive. Accordingly, the optical disc remains usable even if a buffer underrun error occurs. However, when a buffer underrun error occurs, the data file that was being recorded before the occurrence of the buffer underrun error must be recorded again. This wastes the recording performed prior to the occurrence of the buffer underrun error and increases the recording time.

A magneto-optic disc recorder is another type of known data recorder. The magneto-optic disc recorder irradiates a laser beam from an optical head against a magneto-optic disc. This applies residual magnetization to the recording layer of the optical disc and records data on the magneto-optic disc. Mini disc (MD) drives are widely used magneto-optic disc recorders. However, MD drives have the same problem as CD-RW drives.

SUMMARY OF THE INVENTION

It is an object of the present invention to provide a controller of a data recorder that records data in a manner that the continuity of the data is ensured even if the recording of data to a recording medium is interrupted.

The present invention provides a controller for controlling interruption and restarting of data writing to a recording medium. The data written to the recording medium is stored in a buffer memory. The controller includes an encoder connected to the buffer memory. The encoder reads data from the buffer memory to encode the read data and generate recording data. A clock generator is connected to the encoder. The clock generator generates a system clock and provides the system clock to the encoder to operate the encoder. A decoder is connected to the clock generator. The decoder decodes the data written on the recording medium to generate decoded data. A system control circuit is connected to the encoder, the clock generator, and the decoder. The system control circuit decides whether the encoding of the encoder and the decoding of the decoder are synchronized and starts to write the recording data to medium from the encoder when the encoding of the encoder and the decoding of the decoder are synchronized, Subsequent to the interruption of the recording of data. The clock generator suspends to provide the system clock to the encoder until the decoding catches up with the encoding, when the decoding of the decoder is delayed from the encoding of the encoder.

The present invention further provides a method for controlling interruption and restart of writing data to a recording medium. The data is stored in a buffer memory. The method includes generating reproduction data when the writing of data to the recording medium is interrupted by sequentially reading the data written to the recording medium prior to the writing interruption, generating recording data when the writing of data to the recording medium is interrupted by sequentially reading the data stored in the buffer memory, suspending the generation of the recording data when the reproduction data is delayed from the recording data, restarting the generation of the recording data when the delayed reproduction data catches up with the recording data, and restarting the recording of data when the reproduction data and the recording data are synchronized.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
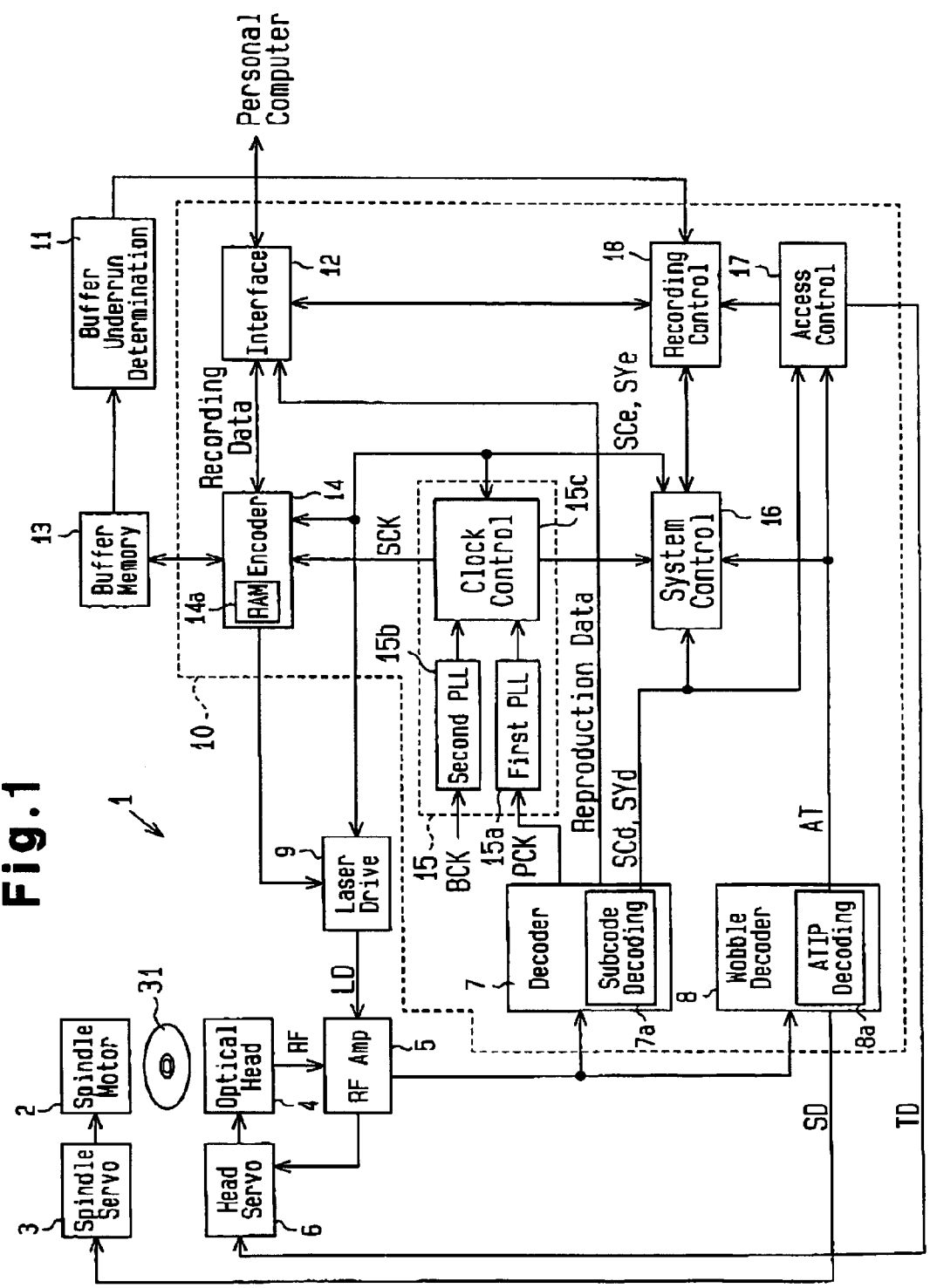
FIG. 1 is a schematic block diagram showing a CD-R drive, which functions as a disc recorder, and a disc recorder controller according to a preferred embodiment of the present invention.

FIG. 1 is a schematic block diagram of a CD-R drive 1, which functions as a disc recording system, employing a data recorder controller according to a preferred embodiment of the present invention. As shown in FIG. 1, the CD-R drive 1 has a recording controller 10, which includes a decoder 7, a wobble decoder 8, and interface 12, an encoder 14, a clock generator 15, a system control circuit 16, an access control circuit 17, and a recording control circuit 18.

In addition to the recording controller 10, the CD-R drive 1 includes a spindle motor 2, a spindle servo circuit 3, an optical head 4, an RF amplifier 5, a head servo circuit 6, a laser drive circuit 9, a buffer underrun determination circuit 11, and a buffer memory (RAM) 13.

The CD-R drive 1 is connected to a personal computer via the external connection terminal 11 to record data, which is provided from the personal computer, on an optical disc 31 that complies with the CD-R standards. Further, the CD-R drive 1 provides the personal computer with data reproduced from the optical disc 31.

The spindle motor 2 rotates the optical disc 31. The spindle servo control circuit 3 controls the spindle motor 2 so that the optical disc 31 is rotated using the constant linear velocity (CLV) method in accordance with a rotation control signal SD generated by a wobble decoder 8.

When reproducing data, the optical head 4 irradiates a relatively weak laser beam against the optical disc 31 and, from the reflected laser beam, generates an RF signal (high frequency signal) in correspondence with the data recorded on the optical disc. When recording data, the optical head 4 irradiates a relatively intense laser beam (several tens of times greater than the data reproducing laser beam) against the optical disc 31 to form recording pits on the recording layer of the optical disc 31 and change the reflecting rate of the recording layer to record data. In synchronism with the recording of data, the optical head 4 generates the RF signal in correspondence with the recorded data from the reflected laser beam.

The RF amplifier 5 amplifies the RF signal, which is provided from the optical head 4, and digitizes the amplified RF signal to generate a digital data signal. The RF signal of the optical head 4 is fed back to the head servo circuit 6 via the RF amplifier 5. The head servo circuit 6 uses the RF signal to perform focusing control, tracking control, and sled feed control. Focusing control focuses the laser beam on the recording layer of the optical disc 31. Tracking control tracks the laser beam along a signal track of the optical disc 31. Sled feed control moves the optical head 4 in the radial direction of the optical disc 31.

The buffer memory 13 is a ring buffer that includes a synchronous dynamic random access memory (SDRAM), which preferably has a FIFO configuration, and the buffer memory 13 stores data provided from the personal computer via the interface 12. Data stored at one address of the buffer memory 13 corresponds to data recorded at one sector of the optical disc 31.

The buffer underrun determination circuit 11 directly or indirectly determines the amount of data stored in the buffer memory 13 from the address at which writing or reading is presently performed. Based on the data amount, the buffer underrun determination circuit 11 determines whether or not the buffer memory 13 is in a state in which buffer underrun may occur.

The decoder 7 of the recording controller 10 decodes the digital data provided from the RF amplifier 5. Further, the decoder 7 generates a pit clock PCK from the digital data and separates a subcode SCd from the digital data to generate a subcode synchronizing signal SYd.

The subcode decoding circuit 7a, which is incorporated in the decoder 7, decodes the subcode SCd. Further, the subcode decoding circuit 7a generates subcode Q channel data (hereafter referred to as subcode Q) from the decoded subcode.

The wobble decoder 8 extracts a wobble component of 22.05 kHz from a pre-groove signal of the optical disc 31 that is included in the digital data provided from the RF amplifier 5. Then, the wobble decoder 8 generates the rotation control signal SD of the optical disc 31 from the wobble component.

The ATIP decoding circuit 8a, which is incorporated in the wobble decoder 8, uses the wobble component to decode an absolute time in pre-groove (ATIP) and extract absolute time information AT, or an ATIP address, from the ATIP. The absolute time information AT indicates addresses of locations in the recording medium.

The interface 12 controls data transmission between the personal computer and the CD-R drive 1.

The encoder 14, which is controlled by the system control circuit 16, reads the data stored in the buffer memory 13 in sector units and encodes the data into recording data for the optical disc 31. A RAM 14A, which is incorporated in the encoder 14, stores data necessary for the encoder 14 to perform encoding and intermediate operation encoding data. When performing data encoding in compliance with the CD-ROM standard, the encoder 14 adds a synch byte, a header, CD-ROM data error detection code (EDC), and an error correction code (ECC) to the data. The encoder 14 further performs error correction using a cross interleaved Reed-Solomon code (CIRC), which is a CD error correction code, and eight to fourteen modulation (EFM) on the data. Further, the encoder 14 adds a subcode SCe, which includes the subcode Q, and a synchronizing signal Syc of the subcode SCe to the data.

The laser drive circuit 9, which is controlled by the system control circuit 16, provides a laser drive signal LD to the laser beam source of the optical head 4. The voltage of the drive signal LD is constant when reproducing data and varied in accordance with the recording data output from the encoder 14 when recording data. When the recording data output from the encoder 14 is low (L), recording pits are not formed on the recording layer of the optical disc 31. Thus, the drive signal LD is set so that its voltage is the same as when data is reproduced. When the recording data is high (H), although the voltage of the drive signal LD differs between track positions, the drive signal LD is set so that its voltage is several tens of times greater than during data reproduction to form recording pits on the recording layer of the optical disc 31.

The access control circuit 17 selectively refers to the time information represented by the subcode Q of the subcode SCd and the time information represented by the absolute time information AT to control the recording control circuit 18 and the head servo circuit 6. This controls access to the optical disc 31.

Based on the determination result of the buffer underrun determination circuit 11 and in response to a command provided from the personal computer, the recording control circuit 18 controls the interface 12, the access control circuit 17, and the system control circuit 16.

The clock generator 15 includes a first PLL 15a, a second PLL 15b, and a clock control circuit 15c. The first PLL circuit 15a generates a first system clock SCK1 based on the pit clock PCK provided from the decoder 7. The second PLL 15b generates a second system clock SCK2 based on a reference clock BCK, which has a fixed frequency and is provided from, for example, a crystal oscillation circuit (not shown).

The system control circuit 16 instructs the clock control circuit 15c to provide the encoder 14 with either the first system clock SCK1 or the second system clock SCK2. When data is being read, the clock control circuit 15c provides the encoder 14 with the first system clock SCK1, which is synchronized with the pit clock PCK. When data is being written, the clock control circuit 15c provides the encoder 14 with the second system clock SCK 2, which is synchronized with the reference clock BCK.

When switching from data reading to data writing, the first system clock SCK1 operates the encoder 14 beforehand so that the laser drive circuit 9 is instantaneously provided with recording data as soon as the switching to data writing occurs.

The first and second system clocks SCK1, SCK2 are provided to each circuit of the CD-drive 1. This synchronizes the circuits of the CD-drive 1.

The clock generator 15 may be provided with only one PLL circuit. In this case, the PLL circuit selectively uses the pit clock PCK and the reference clock BCK to generate the first system clock SCK1 or the second system clock SCK2. Such configuration decreases the circuit scale of the clock generator 15.

After synchronizing the subcode synchronizing signal SYd, which is provided from the decoder 7, with the subcode synchronizing signal SYe, which is added to the recording data by the encoder 14, the system control circuit 16 associates the subcode SCd, which is provided from the decoder 7, with the subcode data SCe, which is added by the encoder 14.

Accordingly, the system control circuit 16 instructs the data recording control circuit 18 to synchronize the data recorded on the optical disc 31 with the recording data provided from the encoder 14.

For example, when the reproduction data from the optical disc 31 is delayed from the recording data provided by the encoder 14, the system control circuit 16 temporarily stops providing the encoder 14 with the first system clock SCK1 to temporarily stop the operation of the encoder 14. When the reproduction data catches up with the recording data, the system control circuit 16 again provides the encoder 14 with the first system clock SCK1 to synchronize the reproduction data of the optical disc 31 with the recording data of the encoder 14.

Further, the system control circuit 16, which is controlled by the recording control circuit 18, controls the encoder 14 and the laser drive circuit 9. When the buffer underrun determination circuit 11 determines that the buffer memory 13 is in a state in which a buffer underrun may occur, the control circuit 16 stores in a memory (not shown) the current address of the buffer memory 13 from which the recording data is read and time information representing the absolute time information AT, which is provided from the wobble decoder 8.

When data is reproduced during a recording restart mode (described later), the system control circuit 16 determines the time for restarting recording based on the address of the data read from the buffer memory 13 and time information represented by the absolute time information AT, which is provided by the wobble decoder 8.

The operation of the CD-R drive 1 will now be discussed.

When a user manipulates the personal computer to record data, the personal computer generates a command accordingly. The command is transferred to the recording control circuit 18 via the interface 12. In response to the command, the recording control circuit 18 controls the interface 12, the access control circuit 17, and the system control circuit 16 to record data.

When recording begins, the system clock generator 15 generates the second system clock SCK2, which is synchronized with the reference clock BCK. As a result, the timing of each circuit of the CD-drive 1 is in accordance with the reference clock BCK.

The data provided from the personal computer is stored in the buffer memory via the interface 12 and read from the buffer memory 13 in sector units. The encoder 14 encodes the data read from the buffer memory 13 in sector units to generate recording data.

The laser drive circuit 9 provides the optical head 4 with a drive signal LD having a voltage corresponding to the recording data. In accordance with the drive signal LD, the optical head 4 changes the intensity of the laser beam emitted against the optical disc 31. This forms recording pits on the recording layer of the optical disc 31 and records data on the optical disc 31. Simultaneously, from the laser beam reflected by the optical disc 31, the optical head 4 reproduces the data recorded on the optical disc 31 as the RF signal. The RF amplifier 5 amplifies the RF signal provided from the optical head 4 to generate digital data.

The wobble decoder 8 extracts the wobble component from the digital data and uses the wobble component to generate the rotation control signal SD. The ATIP decoding circuit 8a decodes the ATIP using the wobble component and extracts the ATIP address of the absolute time information AT in the ATIP.

The spindle servo circuit 3 controls the spindle motor 2 based on the rotation control circuit SD to control the spindle motor 2 so that the optical disc 31 is rotated at a constant linear velocity (CLV). When the transmission rate of the data provided from the personal computer is slower than the transmission rate of the data recorded in the optical disc 31 (write speed), that is, when the transmission rate of the data provided to the buffer 13 is slower than that of the data output from the encoder 14, the amount of data stored in the buffer memory 13 decreases. When the buffer underrun determination circuit 11 determines that a buffer underrun error may occur in the buffer memory 13, the recording control circuit 18 controls the system control circuit 16 so that, before the occurrence of a buffer underrun in the buffer memory 13, the output of recording data from the encoder 14 is interrupted.

The system control circuit 16 stores in a memory (not shown) the buffer memory address of the data being read from the buffer memory 13 when an interrupt signal is provided, Simultaneously, the system control circuit 16 also stores the absolute time information AT of the wobble decoder 8 in the memory.

When the output of the recording data from the encoder 14 is interrupted, the laser drive circuit 9 stops providing the optical head with the drive signal. This stops the emission of the laser beam from the optical head 4 and interrupts the recording of data to the optical disc 31.

Subsequent to the recording interruption, the data provided from the personal computer is stored in the buffer memory 13 via the interface 12. As the amount of data stored in the buffer memory 13 increases, the state in which a buffer underrun may occur no longer exists. When the buffer underrun determination circuit 11 determines that buffer underrun is not likely to occur, the recording control circuit 18 controls the access control circuit 17 and the system control circuit 16 to perform data reproduction in the recording restart mode.

When data reproduction is performed in the recording restart mode, the access control circuit 17 controls the head servo circuit 6. The head servo circuit 6 controls focusing, tracking, and sled feed of the optical head 4 to move the optical head 4 to a sector location that is prior by a predetermined number of sectors from the sector at which the recording interruption occurred. The optical head 4 then irradiates the laser beam from that sector location.

The system control circuit 16 controls the laser drive circuit 9 so that a drive signal having a constant voltage is output from the laser drive circuit 9. This results in the optical head 4 irradiating the optical disc 31 with a relatively weak laser beam. The reflected laser beam reproduces the data recorded on the optical disc 31 prior to the recording interruption, and the optical head 4 outputs the RF signal. The RF signal is amplified by the RF amplifier 5 and converted to digital data. The decoder 7 decodes the digital data, extracts the pit clock PCK from the digital data, and separates the subcode SCd from the digital data. The subcode synchronizing signal SYd is generated from the subcode SCd. The subcode SCd is decoded by the subcode decoding circuit 7a.

When data reproduction in the recording restart mode is started, the system control circuit 16 switches the operational clock from the second system clock SCK2 to the first system clock SCK1. The circuits of the CD-R drive 1 are operated in accordance with the first system clock SCK1, or the pit clock PCK. By using the pit clock PCK, the data recorded on the optical disc 31 prior to the recording interruption is accurately reproduced.

The recording control circuit 18 controls the system control circuit 16 to instruct the encoder 14 to restart the output of the recording data. The encoder 14 goes back by a predetermined number of sectors from the data address of the buffer memory 13 at which the recording interruption occurred and starts reading data in sector units from that sector of the buffer memory 13. The encoder 14 adds a synch code, a header, an EDC, and an ECC to the read data and performs the CIRC and EFM processes on the read data. Then, the encoder 14 adds a subcode to the read data.

The drive signal of the laser drive circuit 9 is constant during data reproduction in the recording restart mode. In other words, the drive signal of the laser drive circuit 9 has a low voltage. Accordingly, laser emission does not affect the data recorded on the optical disc prior to the interruption.

The system control circuit 16 controls the access control circuit 17 via the recording control circuit 18 and synchronizes the data recorded on the optical disc 31 with the recording data output from the encoder 14. In other words, the system control circuit 16 controls the recording control circuit 18 and the access control circuit 17 so that the subcode synchronizing signal SYd of the decoder 7 is synchronized with the subcode synchronizing signal SYe of the encoder 14, and so that the subcode Q of the subcode decoding circuit 7a is associated with the subcode Q of the encoder 14.

The restart of the recording mode controlled by the system control circuit 16 will now be discussed. First, when reproducing data in the recording restart mode, the system control circuit 16 compares the address of the data read from the buffer memory 13 with the address stored in the system control circuit 16 and activates a first restart signal when the data address and the stored address match. The address stored in the system control circuit 16 is the address of the data read from the buffer memory 13 when the recording of data is interrupted.

The system control circuit 16 compares the absolute time information AT of the ATIP decoding circuit 8a when data is reproduced during the recording restart mode with the absolute time information AT stored in the system control circuit 16 and activates a second restart signal when the absolute time information AT matches. The absolute time information AT stored in the system control circuit 16 is the absolute time information AT decoded by the ATIP decoding circuit 8a when the recording of data is interrupted.

When the first and second restart signals are simultaneously activated, the system control circuit 16 controls the interface 12 and the access control circuit 17 via the recording control circuit 18. When recording is restarted, the system clock SCK output from the clock generator 15 is switched from the first system clock SCK1, which is synchronized with the pit clock PCK, to the second system clock SCK2, which is synchronized with the reference clock BCK.

Upon the restart of the recording, the sector location of the optical disc 31 irradiated by the laser beam is shifted to the sector location next to the sector location at which data recording was interrupted. In this state, the system control circuit 16 synchronizes the recording data output from the encoder 14 with the data recorded on the optical disc 31. Accordingly, the data of the sector next to the sector at which data recording was interrupted is recorded upon the restart of the recording. In other words, sectors of data are recorded without any interruptions when restarting recording.

Figure 2A:
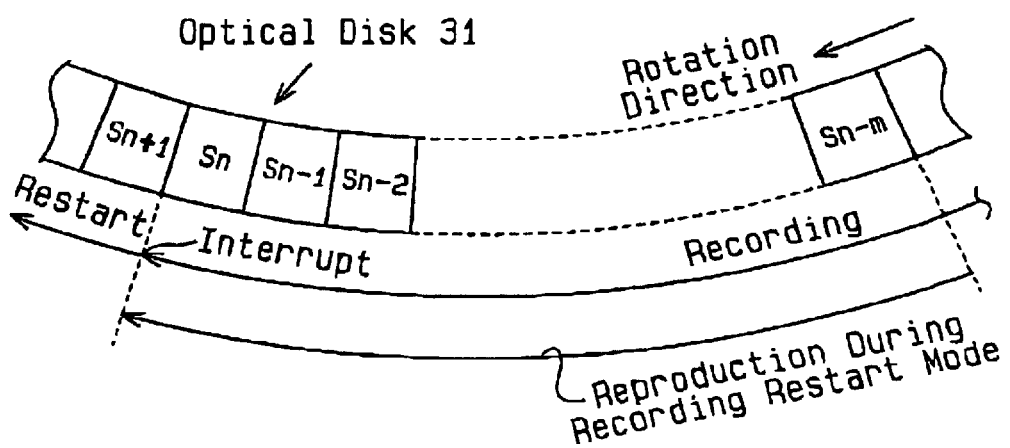
FIG. 2(a) is a schematic diagram showing a sector of an optical disc.
Figure 2B:
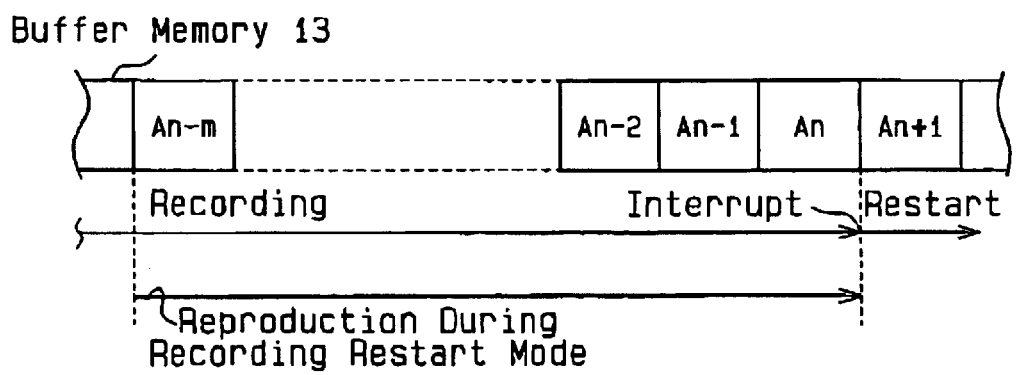
FIG. 2(b) is a diagram illustrating addresses of a buffer memory of the CD-R drive of FIG. 1.

FIG. 2(a) is a schematic view showing a sector of the optical disc 31. FIG. 2(b) is a diagram illustrating the addresses of the buffer memory 13. Sectors Sn+1, Sn, Sn−1, Sn−2, . . . , Sn−m shown in FIG. 2(a) are respectively associated with addresses An+1, An, An−1, An−2, . . . , An−m shown in FIG. 2(b).

During recording, data is read from the buffer memory 13 in the order of addresses An−m, . . . , An−2, An−1, An, and the recording data encoded by the encoder 14 is recorded on the optical disc 31 in the order of sectors Sn−m, . . . , Sn−2, Sn−1, Sn. For example, if the buffer underrun determination circuit 11 determines during the recording of data that a bus underrun may occur at address An, the data of sector Sn, which is associated with address An, is recorded. However, the recording of data is interrupted from the sector Sn+1, which is associated with address An+1.

When the recording of data is interrupted, address An and the time information decoded from the recording data of the sector Sn are stored in the system control circuit 16. Afterward, when the buffer underrun determination circuit 11 determines that a buffer underrun is no longer likely to occur, data reproduction in the recording restart mode is commenced from sector Sn−m by going back from sector Sn, at which recording was interrupted, by a predetermined number of sectors (in this case, m sectors).

When data reproduction is commenced, data is read from the buffer memory 13 from address An−m by going back from address An, at which recording was interrupted, by a predetermined number of addresses (m addresses) The read data is encoded into recording data by the encoder 14.

The system control circuit 16 synchronizes the recording data output from the encoder 14 with the data recorded on the sectors Sn−m to Sn of the optical disc 31. Then, when the address of the data read from the buffer memory 13 matches the address An stored in the system control circuit 16, the first restart signal is activated. When the absolute time information AT decoded by the ATIP decoding circuit 8a matches the absolute time information AT decoded from the recording data of the sector Sn stored in the system control circuit 16, the second restart signal is activated. When the first and second restart signals are simultaneously activated, the system control circuit 16 restarts the recording of data from sector Sn+1, which is next to the sector Sn at which data recording was interrupted.

It is preferred that the predetermined sector number (m sectors) be sufficient for obtaining time period T1, which is required for the spindle servo circuit 3 to control the spindle motor 2 and the head servo circuit 6 to control the optical head 4, and time period T2, which is required for synchronization by the system control circuit 16, For example, m is set at 10 to 30. The time periods T1, T2 increase as the recording speed of the CD-R drive 1 becomes higher, for example, as the recording speed increases from 4× to 8×. Accordingly, it is preferred that the predetermined sector number be increased as the recording speed increases.

Figure 3:
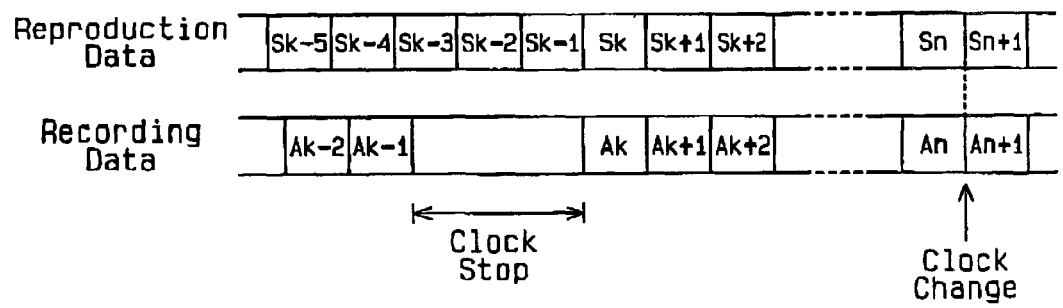
FIG. 3 is a timing chart illustrating the synchronization of reproduction data and recording data.

FIG. 3 is a timing chart illustrating how reproduction data and recording data are synchronized when data is reproduced. Reproduction data "Sn" corresponds to sector Sn of FIG. 2(a), and recording data "An" corresponds to sector address An of FIG. 2(b). In FIG. 3, "k" represents an integer in the range of n−m to n.

As shown in FIG. 3, if the reproduction data is delayed from the recording data by three sectors, the clock generator 15 suspends to provide the first system clock SCK1 to the encoder 14 when sector Sk−3 is read from the optical disc 31. The clock generator 15 puts the encoder 14 in a standby state until three sectors of reproduction data are read from the optical disc. Then, the clock generator 15 restarts providing the first system clock SCK1 to the encoder 14 when sector Sk is read.

Therefore, when reproduction data is read from sector Sk, recording data is read from address Ak of the buffer memory 13. Further, the reproduction data and the recording data are synchronized at sector Sn, which is where recording to the optical disc 31 was interrupted.

Even if the reproduction timing of the reproduction data and the input timing of the recording data are not matched, the reproduction timing and input timing may be synchronized by synchronizing the timing at which the supply of the first system clock SCK1 is started and the timing at which sector Sk is read. Accordingly, data is continuously recorded on the optical disc 31 without any interruptions even when data reproduction is switched to data recording by the switching of the system clock SCK.

It should be apparent to those skilled in the art that the present invention may be embodied in many other specific forms without departing from the spirit or scope of the invention, Particularly, it should be understood that the present invention may be embodied in the following forms.

(1) The present invention may be applied to a controller of a data recorder employing the constant angular velocity (CAV) method. In such case, a clock synchronized with the wobble component, which is extracted by the wobble decoder 8, is generated and used as the system clock SCK.

(2) The present invention may be applied to a controller of a data recorder (e.g., CD-RW drive, MD drive) that uses a rewritable recording medium (e.g., CD-RW standard optical disc, MD standard optical disc). In such case, the occurrence of a buffer underrun error is prevented. This decreases the time required for the recording of data.

(3) The access control circuit 17, the buffer underrun determination circuit 11, the recording control circuit 18, and the system control circuit 16 may be replaced by a microcomputer that includes a CPU, a ROM, and a RAM. In other words, the function of each circuit may be achieved by having a microcomputer perform various operations.

(4) The present invention may be applied when data writing is interrupted due to the displacement of the optical head 4. Data writing to the optical disc 31 is also interrupted when the relative position between the optical head 4 and the optical disc 31 is offset due to a physical impact or a mechanical deficiency. In such case, the writing of data must be restarted from the interrupted position. For the restart of data writing, a mechanism for determining the displacement of the optical head 4 may be used in lieu of the buffer underrun determination circuit 11. The displacement determination mechanism may be formed by a vibration sensor, which detects external vibrations of the optical disc 31, a detection circuit, which detects a tracking error of the optical head 4 relative to the optical disc 31, or the like.

The present examples and embodiments are to be considered as illustrative and not restrictive, and the invention is not to be limited to the details given herein, but may be modified within the scope and equivalence of the appended claims.

What is claimed is:

1. A controller for controlling interruption and restarting of data writing to a recording medium, wherein the data written to the recording medium is stored in a buffer memory, the controller comprising:

an encoder connected to the buffer memory, for encoding data which is read data from the buffer memory to generate recording data;

a clock generator connected to the encoder, for generating a system clock and providing the system clock to the encoder to operate the encoder;

a decoder connected to the clock generator, for decoding the data written on the recording medium to generate decoded data; and a system control circuit connected to the encoder, the clock generator, and the decoder, for deciding whether the encoding of the encoder and the decoding of the decoder are synchronized and starting to write the recording data to the recording medium from the encoder when the encoding of the encoder and the decoding of the decoder are synchronized, subsequent to the interruption of the recording of data, wherein the clock generator generates a first system clock in accordance with the decoding of the decoder, generates a second system clock based on a reference clock having a predetermined frequency, suspends providing the first system clock to the encoder until the decoding catches up with the encoding when the decoding of the decoder is delayed from the encoding of the encoder, provides the first system clock to the encoder during a period in which the encoding of the encoder and the decoding of the decoder are synchronized, and provides the second system clock to the encoder from when the decoding of the decoder and the encoding of the encoder reach the data at which data recording was interrupted.

2. The controller according to claim 1, wherein the decoder generates a pit clock based on the decoded data, and the clock generator generates the first system clock based on the pit clock.

3. The controller according to claim 2, wherein the clock generator includes a phase-locked loop (PLL) circuit connected to the decoder, wherein the PLL circuit generates the first system clock and the second system clock and selectively outputs the first and second system clocks.

4. The controller according to claim 2, wherein the clock generator includes:
   a first PLL circuit connected to the decoder to generate a first system clock;
   a second PLL circuit for generating a second system clock based on a reference clock; and
   a clock control circuit connected to the first and second PLL circuits, wherein the clock control circuit selectively provides the first and second system clocks to the encoder.

5. A controller for controlling interruption and restarting of data writing to a recording medium, wherein the data written to the recording medium is stored in a buffer memory, the controller comprising:
   an encoder connected to the buffer memory, for encoding data which is read data from the buffer memory to generate recording data;
   a clock generator connected to the encoder, for generating a system clock and providing the system clock to the encoder to operate the encoder;
   a decoder connected to the clock generator, for decoding the data written on the recording medium to generate decoded data; and
   a system control circuit connected to the encoder, the clock generator, and the decoder, for deciding whether the encoding of the encoder and the decoding of the decoder are synchronized and starting to write the recording data to the recording medium from the encoder when the encoding of the encoder and the decoding of the decoder are synchronized, subsequent to the interruption of the recording of data,
   wherein the clock generator generates a first system clock in accordance with the decoding of the decoder, generates a second system clock based on a reference clock having a predetermined frequency, wherein the clock generator suspends providing the first system clock to the encoder until the decoding catches up with the encoding when the decoding of the decoder is delayed from the encoding of the encoder during synchronization of the encoder and the decoder, provides the first system clock to the encoder during a period in which the encoding of the encoder and the decoding of the decoder are synchronized, and provides the second system clock to the encoder from when the decoding of the decoder and the encoding of the encoder reach the data at which data recording was interrupted.

6. The controller according to claim 5, wherein the decoder generates a pit clock based on the decoded data, and the clock generator generates the first system clock based on the pit clock.

7. The controller according to claim 6, wherein the clock generator includes a phase-locked loop (PLL) circuit connected to the decoder, wherein the PLL circuit generates the first system clock and the second system clock and selectively outputs the first and second system clocks.

8. The controller according to claim 6, wherein the clock generator includes:
   a first PLL circuit connected to the decoder to generate a first system clock;
   a second PLL circuit for generating a second system clock based on a reference clock; and
   a clock control circuit connected to the first and second PLL circuits, wherein the clock control circuit selectively provides the first and second system clocks to the encoder.

9. A controller for controlling interruption and restarting of data writing to a recording medium, wherein the data written to the recording medium is stored in a buffer memory, and the controller controls the interruption of the data writing to the recording medium when the buffer memory is in a state in which buffer underrun may occur and controls the restarting of the data writing to the recording medium when the buffer memory is in a state in which buffer underrun is no longer likely to occur, the controller comprising:
   an encoder connected to the buffer memory, for encoding data which is read data from the buffer memory to generate recording data;
   a clock generator connected to the encoder, for generating a system clock and providing the system clock to the encoder to operate the encoder;
   a decoder connected to the clock generator, for decoding the data written on the recording medium to generate decoded data; and
   a system control circuit connected to the encoder, the clock generator, and the decoder, for deciding whether the encoding of the encoder and the decoding of the decoder are synchronized and starting to write the recording data to the recording medium from the encoder when the encoding of the encoder and the decoding of the decoder are synchronized, subsequent to the interruption of the recording of data,
   wherein the clock generator generates a first system clock in accordance with the decoding of the decoder, generates a second system clock based on a reference clock having a predetermined frequency, and wherein, the clock generator suspends providing the first system clock to the encoder until the decoding catches up with the encoding when the decoding of the decoder is delayed from the encoding of the encoder, provides the first system clock to the encoder during a period in which the encoding of the encoder and the decoding of the decoder are synchronized, and provides the second system clock to the encoder from when the decoding of the decoder and the encoding of the encoder reach the data at which data recording was interrupted.

10. The controller according to claim 9, wherein the decoder generates a pit clock based on the decoded data, and the clock generator generates the first system clock based on the pit clock.

11. The controller according to claim 10, wherein the clock generator includes a phase-locked loop (PLL) circuit connected to the decoder, wherein the PLL circuit generates the first system clock and the second system clock and selectively outputs the first and second system clocks.

12. The controller according to claim 10, wherein the clock generator includes:
   a first PLL circuit connected to the decoder to generate a first system clock;
   a second PLL circuit for generating a second system clock based on a reference clock; and
   a clock control circuit connected to the first and second PLL circuits, wherein the clock control circuit selectively provides the first and second system clocks to the encoder.

* * * * *